UNITED STATES PATENT OFFICE.

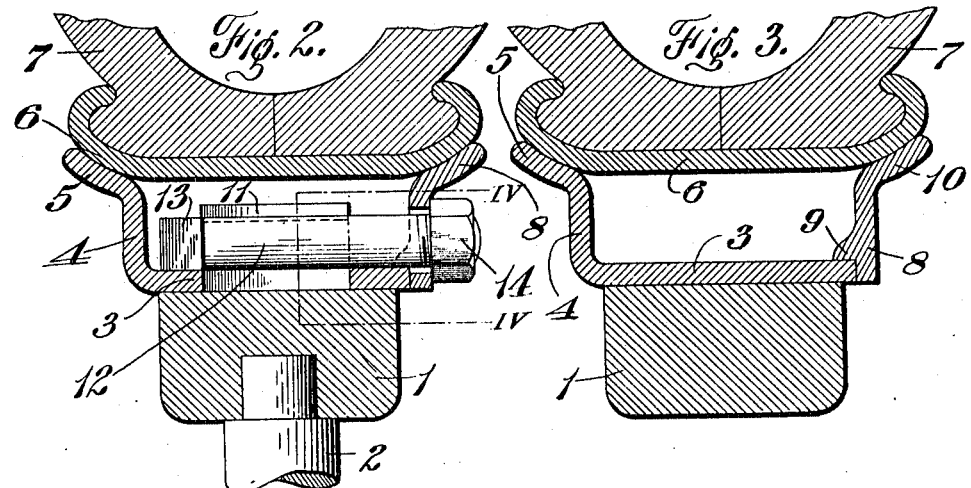

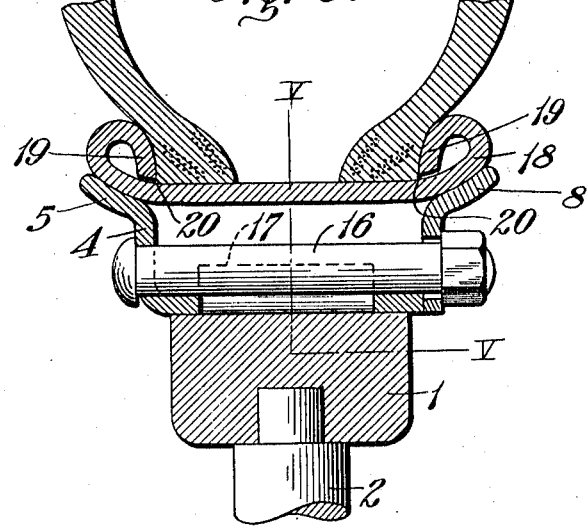
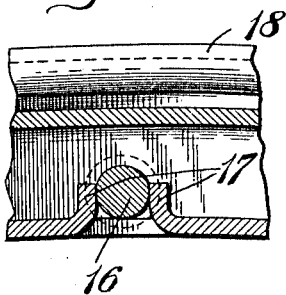

HARRY M. SNYDER, OF DETROIT, MICHIGAN, ASSIGNOR TO DETROIT DEMOUNTABLE RIM CO., OF DETROIT, MICHIGAN, A CORPORATION OF MICHIGAN.

WHEEL-RIM CONSTRUCTION.

1,107,720.  Specification of Letters Patent.  Patented Aug. 18, 1914.

Application filed September 18, 1911. Serial No. 649,857.

*To all whom it may concern:*

Be it known that I, HARRY M. SNYDER, a citizen of the United States of America, residing at Detroit, in the county of Wayne and State of Michigan, have invented certain new and useful Improvements in Wheel-Rim Construction, of which the following is a specification, reference being had therein to the accompanying drawings.

In the construction of wheel rims and tire holding devices for automobiles and like vehicles and more especially those of the so-called "demountable rim" type, it is common to have rim holding devices which are anchored or secured to the wheel felly itself. This necessitates the cutting away of the felly for the reception of bolts, clamps or like holding devices and thereby increases the cost of construction as well as diminishes the strength of the wheel structure. Furthermore it requires the refitting of an ordinary felly for the reception of the tire holding means.

This invention relates to a wheel rim construction which is secured in position without weakening or cutting the wheel felly in any way so that the device itself may be attached to any wheel without special treatment of the latter.

A further object of the construction is the housing of the holding means so that they are not affected by weather.

Another advantage is the adaptability of the construction for use with demountable rims both of the "clencher type" and also of the so-called "straight" construction.

Another feature is the simplicity and consequent low cost of the construction.

The invention consists in the matters hereinafter set forth, and more particularly pointed out in the appended claims.

In the drawings, Figure 1 is a view in elevation, partly broken away, of a wheel rim construction embodying features of the invention; Fig. 2 is an enlarged view in detail in transverse section through the wheel rim and felly showing holding means; Fig. 3 is a view in cross section in detail adjacent the holding means; Fig. 4 is a view in detail in transverse section on or about line IV—IV of Fig. 2; Fig. 5 is a view showing the adaptation of the construction to a so-called "straight" rim, and also illustrating a slight change in the arrangement of the rim fastening means; and Fig. 6 is a view in section on or about line V—V.

Referring to the drawings, a wheel of standard construction of any preferred type has a solid felly 1 mounted on spokes 2. A felly band 3 preferably of rolled or pressed metal encircles the periphery of the felly on which it is shrunk in the usual manner of metal tires. The band is provided with a marginal flange 4, preferably integral therewith, having an outwardly flaring lip 5 whose inner face forms a seat for a detachable rim 6 on which a tire 7 of the clencher type may be secured in the usual manner by the inturned edges 15. The other margin of the band opposite the flange 4 forms a seat for a rim ring 8 that is preferably split so that a bearing shoulder 9 on the ring may readily conform to slight inequalities in the band on which it is seated. The ring has an outwardly flared shoulder 10 corresponding to the part 5 of the band flange 4 and when the ring is drawn to seat properly, this shoulder co-acts with the part 5 against the rounded or flared parts of the rim 6 to enter the latter in proper position.

A series of holding projections 11 are formed on the outer periphery of the band 3 between its margins. In the preferred construction as herein indicated these are tongues struck out from the body of the band. Bolts 12 with suitably shaped heads 13 are engaged by the projections, the latter, if of preferred form, being bent around the body of the bolt to retain it. Each of the bolts extends through an opening somewhat larger than the body of the bolt in the rim ring 8, the latter being drawn to place by suitably applied nuts 14. Or, as indicated in Figs. 5 and 6, bolts 16 may be used that extend through the flange 4, being held from displacement by suitably disposed lips 17 struck up or secured on the band. As also indicated in Figs. 5 and 6, the construction may include a demountable rim 18 with inrolled margins 19 so disposed that the angular shoulders 20 of a so-called straight tire find ready seat, the outer contour of the rim being the same as that of the clencher rim of Figs. 1 to 4.

The construction gives adequate holding means for a demountable rim of either clencher or straight tire type, without in any way defacing or cutting away the body of the wheel felly itself and may be applied to any wheel in the same manner as any ordinary metal tire. The holding means are rigidly secured and cannot become loose and are housed from the weather. The construction is extremely simple and the cost thereof is correspondingly low.

Obviously, changes in the details of construction may be made without departing from the spirit of the invention and I do not wish to limit myself to any particular form or arrangement of parts.

What I claim is:—

1. A wheel rim construction comprising a felly, a band shrunk around the felly, projections struck up from the outer face of the band, a rim seat flange on one side of the band, a rim holding ring opposite to the flange with which it co-acts, a demountable rim adapted to be secured on the flange by the ring, and means between the projections of the band for drawing the ring into operative relation to the flange of the rim.

2. A wheel rim construction comprising a band, a rim seat flange on one margin thereof, pairs of oppositely disposed projections struck up from the face of the band, bolts secured to the band between the pairs of projections, a ring adapted to seat on the band opposite the flange, and a demountable rim adapted to be supported on the flange and ring, the bolts operating to draw the ring into operative relation to the flange and rim.

In testimony whereof I affix my signature in presence of two witnesses.

HARRY M. SNYDER.

Witnesses:
 A. M. SHANNON,
 C. R. STICKNEY.